United States Patent Office 2,773,921
Patented Dec. 11, 1956

2,773,921

PHOSPHORIC ACID-VANADIUM PENTOXIDE CATALYST AND HYDROCARBON CONVERSIONS THEREWITH

Paul N. Rylander, Jr., Chicago, Ill., and Wilford J. Zimmerschied, Crown Point, Ind., assignors to Standard Oil Company, Chicago, Ill., a corporation of Indiana No Drawing. Application September 30, 1953, Serial No. 383,398

17 Claims. (Cl. 260—683.15)

This invention relates to a novel process for the preparation of complex, acidic, solid catalysts, the catalysts thereby produced, and to hydrocarbon conversions, particularly the conversion of olefins, in the presence of said catalysts. More specifically, this invention relates to catalysts derived from vanadium pentoxide and certain acids of phosphorus as a result of chemical reaction.

One object of our invention is to provide novel catalysts which are useful in hydrocarbon conversions, particularly the conversions of normally gaseous olefins. Another object is to provide a facile and economical method for the preparation of acidic, complex, mechanically stable catalysts from vanadium pentoxide. An additional object is to provide novel catalytic conversions employing the catalysts of the present invention. These and other objects of our invention will become apparent from the ensuing description thereof.

We have found that vanadium pentoxide and a phosphoric acid selected from the group consisting of anhydrous orthophosphoric acid, pyrophosphoric and triphosphoric acid, in the proportions of between about 0.1 and about 0.4 mols of vanadium pentoxide per gram atom of phosphorus contained in said phosphoric acid, undergo chemical reaction at elevated temperatures to produce non-stoichiometric, acidic, complex, solid catalysts containing vanadium, phosphorus, oxygen and hydrogen. The reaction between vanadium pentoxide and the phosphorus acid results in the liberation of water. Temperatures of about 220° C. to about 600° C. may be used, although we usually employ about 220 to about 400° C.

Heating is continued for a sufficient period of time to develop suitable mechanical strength in the catalyst. Before heating the catalyst preparation reaction mixture, the catalytic material is soft and wet, but after a suitable heating treatment, the catalytic material is hard, dry and very reactive. The heating of the catalyst preparation mixture may be discontinued shortly after the exothermic reaction between the vanadium pentoxide and acid of phosphorus occurs.

The preferred molar ratios are between about 0.1 and about 0.3 mols of vanadium pentoxide per gram atom of phosphorus, suitably about 0.15 to 0.25 mols of vanadium pentoxide per gram atom of phosphorus contained in the phosphoric acid of the selected class. If desired, $P_2O_5$ can be added to $H_3PO_4$ before reaction with vanadium pentoxide.

When vanadium pentoxide and the phosphoric acid are mixed in the above-mentioned proportions, a dough-like or mushy mass is produced which can be shaped, as by extrusion, molding or pelleting; following the shaping of the catalyst mass, the shaped particles can be heated to effect reaction between the vanadium pentoxide and the acid of phosphorus, resulting in the production of a hard, mechanically stable, extremely reactive acidic catalyst. When less than about 0.1 mol of vanadium pentoxide is employed per gram atom of phosphorus in the acid, sticky catalysts having undesirable mechanical properties are produced. When excessive ratios of $V_2O_5$ are employed, catalyst activity is greatly reduced or catalytically inactive solid materials are formed.

The following examples are introduced to illustrate but not necessarily to delimit our invention. A series of catalysts were prepared by heating the various phosphoric acids with vanadium pentoxide in an open glass vessel under a hood at about 350° C. to about 380° C. for periods between about 2 and 4 hours. The solid catalysts thus prepared were crushed and the powdered catalyst was employed for the polymerization of propylene in standard polymerization tests ("standard conditions"). In these tests, propylene was polymerized at 200° C. with 10 weight percent of the catalyst and the extent of propylene conversion to liquid polymers after various periods of time was noted. The "polyphosphoric" acid employed in the catalyst preparations had the following composition:

| | Percent |
|---|---|
| Meta-phosphoric acid ($HPO_3$) | 3.6 |
| Triphosphoric acid ($H_5P_3O_{10}$) | 47.8 |
| Pyrophosphoric acid ($H_4P_2O_7$) | 28.6 |
| Ortho-phosphoric acid ($H_3PO_4$) | 20.0 |

TABLE

| Example | Acid | $V_2O_5$, by wt. acid | Mols $V_2O_5$ g. atom P | Propylene polymerization [1] |
|---|---|---|---|---|
| 1 | Anhydrous $H_3PO_4$ | 0.65 | 0.35 | 6% conversion in 2 hours. |
| 2 | do | 0.50 | 0.27 | 20% conversion in 2.5 hours. |
| 3 | do | 0.33 | 0.18 | 75% conversion in 2.5 hours. |
| 4 | Polyphosphoric | 0.70 | 0.35 | 34.5% conversion in 2 hours. |
| 5 | do | 0.50 | 0.244 | 52% conversion in 3 hours. |
| 6 | do | 0.33 | 0.162 | 48% conversion in 1.5 hours. |
| 7 | Pyrophosphoric | 0.5 | 0.244 | 15% conversion in 75 minutes. |
| 8 | do | 0.33 | 0.18 | 53% conversion in 2 hours. |

[1] Standard conditions.

It will be noted from Example 2 that anhydrous orthophosphoric acid and vanadium pentoxide can be employed to form a hard, active catalyst when proper proportions of each reagent are employed. The crushing strength of this catalyst (radial application of pressure) was in the range of 2 to 8 lbs. when the catalyst was employed in the form of cylindrical pellets of $3/16$-inch diameter and length. In Example 1, in which the ratio of mols of vanadium pentoxide to gram atom of phosphorus was increased to 0.35, as compared with 0.27 of Example 2, the catalyst was characterized by a decreased rate of propylene conversion under the standard operating conditions. On the other hand, when the ratio of mols of vanadium pentoxide to gram atom of phosphorus was decreased to 0.18, as in Example 3, an extremely reactive catalyst was produced as evidenced by the fact that it converted 75% of the propylene charging stock in 2.5 hours. In addition, a catalyst was prepared from anhydrous $H_3PO_4$ and $V_2O_5$ in which the ratio of mols of $V_2O_5$ to gram atom of phosphorus was 0.1; this catalyst proved to be reactive for propylene polymerization but it was somewhat sticky and the mechanical properties of this catalyst were not as good as those of the catalysts of Examples 2 and 3.

An attempt was made to substitute 85% (syrupy) orthophosphoric acid for anhydrous $H_3PO_4$ in the preparation of catalysts. Thus a solid material was prepared by heating two parts of the syrupy phosphoric acid and one part of vanadium pentoxide at 360° C. for 2.5 hours. This material was totally inactive for the polymerization of propylene under the conditions of the standard test.

Examples 4 to 6, inclusive, indicate the successful employment of commercial polyphosphoric acid in the preparation of catalysts. In addition, a $V_2O_5$-polyphosphoric acid catalyst was prepared in which the ratio of mols of $V_2O_5$ to gram atom of phosphorus was 0.1; this catalyst was active for propylene polymerization but it was somewhat tacky and its mechanical properties were inferior to the mechanical properties of the catalyst employed in Examples 4, 5 and 6. Two catalysts were prepared in which the ratio of mols of $V_2O_5$ to gram atom of phosphorus was, respectively, 0.45 and 0.49, corresponding to weight ratios of $V_2O_5$ to acid of 0.93 and 1.00, respectively; the former catalyst yielded only a trace of polymer under standard conditions and about 2 hours and the latter proved completely inactive.

Examples 7 and 8 indicate that catalysts can be prepared from vanadium pentoxide and pyrophosphoric acid, when the reagents are employed in proper proportions.

The utility of vanadium pentoxide for the preparation of catalysts is very surprising considering the inutility of vanadium trioxide, which was employed under the same conditions as before in an attempt to prepare catalysts, as shown by the following table.

| Acid | $V_2O_3$, by wt. acid | Mols $V_2O_3$ g. atom P | Propylene polymerization [1] |
|---|---|---|---|
| Anhydrous $H_3PO_4$ | 0.5 | .327 | Inactive. |
| Polyphosphoric | 0.5 | .292 | Very slight activity. |

[1] Standard conditions.

Our catalysts require no supporting material but can be extended or modified, if desired, by the inclusion of porous or non-porous materials such as kieselguhr, alumina, titania, zirconia, chromia, charcoal, glass beads, silica beads, silica gel, fragments or the like. The supporting or modifying material may, in some instances, be added to the reaction mixture of vanadium pentoxide and the acid of phosphorus before or during reaction; alternatively, the reaction between vanadium pentoxide and the phosphorus acid may be effected, the resultant product may be ground, and the powder may then be blended with supporting or modifying materials. By the same techniques, the catalysts of the present invention may be modified by the addition of various promoting metal oxides in proportions between about 0.5 and about 20 percent, based on the total weight of catalyst, for example, oxides of metals selected from groups 4, 5 and 6 of the Periodic Table, viz. oxides of Ti, Zr, Th, Nb, Ta, Cr, Mo, W; group 2 metal oxides such as ZnO or MgO; group 8 metal oxides such as the oxides of iron, cobalt, nickel or platinum. For the purposes of various hydrocarbon conversions, our new catalyst may be promoted, if desired, by addition to the conversion zone of a small proportion (for example, 0.1 to 5 percent by weight of the catalyst) of a hydrogen halide such as hydrogen chloride, hydrogen bromide or material affording hydrogen halide (for example, alkyl halides), or a Friedel-Crafts halide such as $BF_3$, $AlCl_3$, $TiCl_4$, $ZrCl_4$ and the like.

Although certain specific uses of our catalyst have been described above, these are merely illustrative. In general, the novel catalysts of this invention may be employed to facilitate various conversions, particularly of hydrocarbons, which have heretofore been catalyzed by other acidic catalysts (proton or Lewis acids) such as sulfuric acid, hydrofluoric acid, liquid or "dry" phosphoric acids, $AlCl_3$, acidic silica-alumina catalysts, active clays, and the like. Olefin conversions, e. g. the polymerization of propylene or alkylation with propylene, are usually effected at temperatures between about 150° C. and about 300° C. Our new catalysts may be employed for the cracking of heavy naphthas or gas oils at high temperatures, decolorization of petroleum fractions, removal of diolefinic components from cracked gasolines, polymerization of normally gaseous olefins, alklation of aromatic hydrocarbons or heterocyclic compounds such as thiophene, furan and the like, isomerization of methyl paraffins such as 2-methylpentane, isomerization of xylenes and dehydrogenation reactions, for example dehydrogenation of cumene to produce alphamethylstyrene.

As a specific example of the alkylation activity of the catalysts which can be produced by the process of the present invention, the following experiment was performed. A stainless steel stirring autoclave was charged with 85 g. toluene, 19 g. propylene and 5 g. of catalyst prepared by heating $V_2O_5$ and commercial polyphosphoric acid in a weight ratio of 1:3. Reaction was effected by stirring the reactor contents for 1.5 hours at 200° C. Following this operation, the hydrocarbon products were separated by fractional distillation to yield 11 g. of cymenes fraction, corresponding to 20% conversion, based on the propylene charged.

The catalysts produced by the present invention may also be employed for the interaction of olefins with hydrogen sulfide to produce mercaptans; the interaction of olefins, carbon monoxide and steam to produce carboxylic acids; the polymerization of olefin oxides; the interaction of alcohols, phenols or mercaptans with olefin oxides to produce polyalkoxy derivatives thereof; the dehydration of alcohols to produce olefins and ethers; the dehydration of 1,3-butylene glycol to produce butadiene; the reactions of olefins with carboxylic acids to form esters, etc. The catalysts of the present invention may also be employed in the oxidation of paraffins to carboxylic acids, of xylenes to toluic and phthalic acids, the oxidation of naphthenes, etc., employing conventional oxidants such as air, oxygen, oxygen-enriched air, etc., under otherwise conventional operating conditions.

When it becomes necessary to regenerate the present catalysts by reason of the accumulation thereon of hydrogen-deficient carbonaceous materials or other catalysis-inhibiting materials, this may be accomplished by contacting the catalyst with oxygen-containing gases such as air or flue gases containing 1 to 10 volume percent oxygen at temperatures between about 400° C. and about 500° C. and atmospheric pressure for about ½ to about 10 hours. Also, as a preliminary to the above-mentioned regeneration treatments, it may be desirable to extract the catalyst with a hydrocarbon solvent such as benzene, pentane, hexane, or the like, at temperatures between about 50 and about 200° C. under pressure sufficient to maintain the extractant in the liquid phase, in order to remove extractable hydrocarbon residues from the catalyst.

Having thus described our invention, we claim:

1. A solid catalyst, suitable for catalyzing conversions of olefinic hydrocarbons, said catalyst being produced by reaction of vanadium pentoxide and an acid of phosphorus selected from the class consisting of substantially anhydrous orthophosphoric acid, pyrophosphoric acid and triphosphoric acid in proportions between about 0.1 and about 0.4 mol of vanadium pentoxide per gram atom of phosphorus contained in said acid, at a reaction temperature between about 220° C. and about 600° C.

2. The product of claim 1 wherein reaction is effected at a temperature between about 220° C. and about 400° C.

3. The product of claim 1 wherein between about 0.15 and about 0.3 mol of vanadium pentoxide is employed per gram atom of phosphorus and reaction is effected at a temperature between about 220° C. and about 400° C.

4. A solid catalyst, suitable for catalyzing conversions of olefinic hydrocarbons, said catalyst being produced by reaction of vanadium pentoxide and substantially anhydrous orthophosphoric acid in proportions between about 0.1 and about 0.40 mol of vanadium pentoxide per gram atom of phosphorus contained in said acid, at a reaction temperature between about 220° C. and about 600° C.

5. A solid catalyst, suitable for catalyzing conversions of olefinic hydrocarbons, said catalyst being produced by reaction of vanadium pentoxide and substantially anhydrous pyrophosphoric acid in proportions between about 0.1 and about 0.40 mol of vanadium pentoxide per gram atom of phosphorus contained in said acid, at a reaction temperature between about 220° C. and about 600° C.

6. The catalyst of claim 1 wherein a mixture of phosphoric acids comprising a substantial proportion of triphosphoric acid is employed in the preparation of said catalyst.

7. A process for the production of a solid catalyst, suitable for catalyzing conversions of olefinic hydrocarbons, which process comprises mixing vanadium pentoxide with an acid of phosphorus selected from the class consisting of substantially anhydrous orthophosphoric acid, pyrophosphoric acid and triphosphoric acid in proportions between about 0.1 and about 0.40 mol of vanadium pentoxide per gram atom of phosphorus contained in said acid, and heating said mixture at a reaction temperature between about 220° C. and about 600° C.

8. The process of claim 7 wherein between about 0.15 and about 0.3 mol of vanadium pentoxide is employed per gram atom of phosphorus contained in said acid and said reaction temperature is between about 220° C. and about 400° C.

9. A process for the production of a solid catalyst, suitable for catalyzing conversion of olefinic hydrocarbons, which process comprises mixing vanadium pentoxide with substantially anhydrous orthophosphoric acid in proportions between about 0.1 and about 0.40 mol of vanadium pentoxide per gram atom of phosphorus contained in said acid, and heating said mixture at a reaction temperature between about 220° C. and about 600° C.

10. A process for the production of a solid catalyst, suitable for catalyzing conversion of olefinic hydrocarbons, which process comprises mixing vanadium pentoxide with substantially anhydrous pyrophosphoric acid in proportions between about 0.1 and about 0.40 mol of vanadium pentoxide per gram atom of phosphorus contained in said acid, and heating said mixture at a reaction temperature between about 220° C. and about 600° C.

11. A process for the production of a solid catalyst, suitable for catalyzing conversion of olefinic hydrocarbons, which process comprises mixing vanadium pentoxide with a mixture of substantially anhydrous phosphoric acids including a substantial proportion of triphosphoric acid in proportions of between about 0.1 and about 0.40 mol of vanadium pentoxide per gram atom of phosphorus contained in said mixture, and heating said mixture at a reaction temperature between about 220° C. and about 600° C.

12. The process of claim 11 wherein the molar ratio of vanadium pentoxide to phosphorus is between about 0.15 and about 0.3 and said temperature is between about 220° C. and about 400° C.

13. A process for the conversion of hydrocarbons, which process comprises subjecting a hydrocarbon under reaction conditions to contact with a catalyst prepared by the process of claim 7.

14. A process for the conversion of an olefin, which process comprises contacting said olefin under reaction conditions with a catalyst prepared by the process of claim 7.

15. The process of claim 14 wherein said olefin is propylene.

16. A process for the polymerization of propylene which comprises contacting propylene under polymerization conditions with a catalyst prepared by the process of claim 7.

17. A process for the alkylation of propylene which comprises contacting propylene and an alkylatable hydrocarbon under alkylation conditions with a catalyst prepared by the process of claim 7.

References Cited in the file of this patent

UNITED STATES PATENTS

| 2,191,156 | Pier et al. | Feb. 20, 1940 |
| 2,271,942 | Keunecke et al. | Feb. 3, 1942 |
| 2,656,322 | Eberle | Oct. 20, 1953 |

OTHER REFERENCES

Jour. Chem. So., Japan, Pure Chem. Section, 71, (1950), pages 595–6, by Denzo Koike; abstracted in Chemical Abstracts, vol. 45, 1951, page 6774f.